(12) United States Patent
Nakazawa

(10) Patent No.: US 11,782,417 B2
(45) Date of Patent: Oct. 10, 2023

(54) METHOD OF MANUFACTURING 3D MODELED OBJECT

(71) Applicant: Souichi Nakazawa, Kanagawa (JP)

(72) Inventor: Souichi Nakazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 18 days.

(21) Appl. No.: 17/525,995

(22) Filed: Nov. 15, 2021

(65) Prior Publication Data

US 2022/0155755 A1 May 19, 2022

(30) Foreign Application Priority Data

Nov. 17, 2020 (JP) ................. 2020-190724

(51) Int. Cl.
  *G05B 19/4099* (2006.01)
(52) U.S. Cl.
  CPC ............... *G05B 19/4099* (2013.01); *G05B 2219/35134* (2013.01); *G05B 2219/49023* (2013.01)
(58) Field of Classification Search
  CPC ...... G05B 19/4099; G05B 2219/35134; G05B 2219/49023; B29C 64/165; B29C 64/393; B33Y 10/00; B22F 2999/00; B22F 10/30; B22F 10/68; B22F 10/14; B28B 1/001
  USPC ............. 700/119, 98; 264/308, 401
  See application file for complete search history.

(56) References Cited

U.S. PATENT DOCUMENTS

| | | | |
|---|---|---|---|
| 6,936,212 B1* | 8/2005 | Crawford | B29C 41/36 |
| | | | 264/401 |
| 2018/0297284 A1* | 10/2018 | Fulop | B29C 64/35 |
| 2021/0237160 A1* | 8/2021 | Barbati | B33Y 50/00 |
| 2021/0291274 A1* | 9/2021 | Sercombe | B33Y 10/00 |

FOREIGN PATENT DOCUMENTS

| | | |
|---|---|---|
| JP | 2018-126912 | 8/2018 |
| WO | 2020/014668 A2 | 1/2020 |
| WO | WO-2020014668 A2 * | 1/2020 ............. B22F 10/10 |

OTHER PUBLICATIONS

Extended European Search Report dated Apr. 19, 2022 in European Patent Application No. 21206628.6, 11 pages.

(Continued)

*Primary Examiner* — Thomas C Lee
*Assistant Examiner* — Michael Tang
(74) *Attorney, Agent, or Firm* — XSENSUS LLP

(57) ABSTRACT

A method of manufacturing a 3D modeled object, includes modeling including applying a modeling solution to powder laid in layers, hardening the powder to which the modeling solution applied to form modeling layers, and sequentially stacking the modeling layers to form a 3D modeled object; and immersing the 3D modeled object modeled at the modeling in a removal solution to remove the powder to which the modeling solution is not applied. At the modeling, the modeling solution is applied such that a density of the modeling solution in an inside of the 3D modeled object is smaller than a density of the modeling solution in a surface of the 3D modeled object and an area of the powder to which the modeling solution is applied and an area of the powder to which the modeling solution is not applied are alternate in the inside of the 3D modeled object.

10 Claims, 12 Drawing Sheets

(56) References Cited

OTHER PUBLICATIONS

Mohsen Ziaee, et al., "Binder jetting: A review of process, materials, and methods", Additive Manufacturing, vol. 28, Jun. 22, 2019, pp. 781-801, XP055654751.
Anonymous, "Five Reasons High DPI Doesn't Equal High-Quality in Binder Jetting", Jun. 14, 2021, XP055897207, Retrieved from the Internet: URL:https://web.archive.org/web/20210614181014/https://www.exone.com/en-US/Resources/News/Five-Reasons-High-DPI-Doesn-t-Equal-High-Quality [retrieved on Mar. 3, 2022], 8 pages.

* cited by examiner

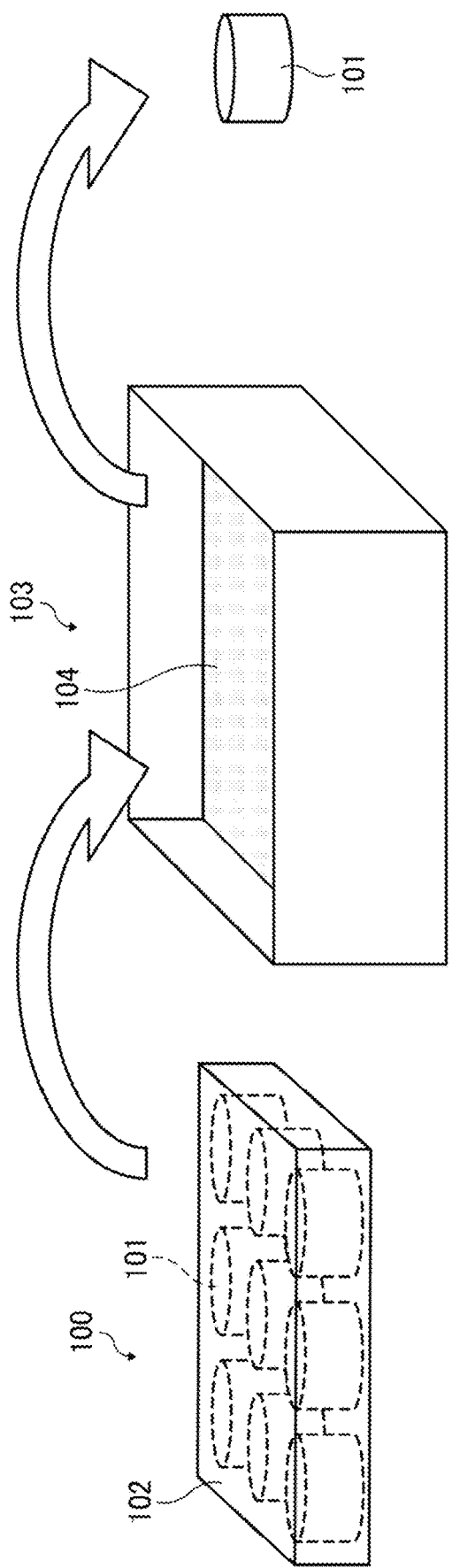

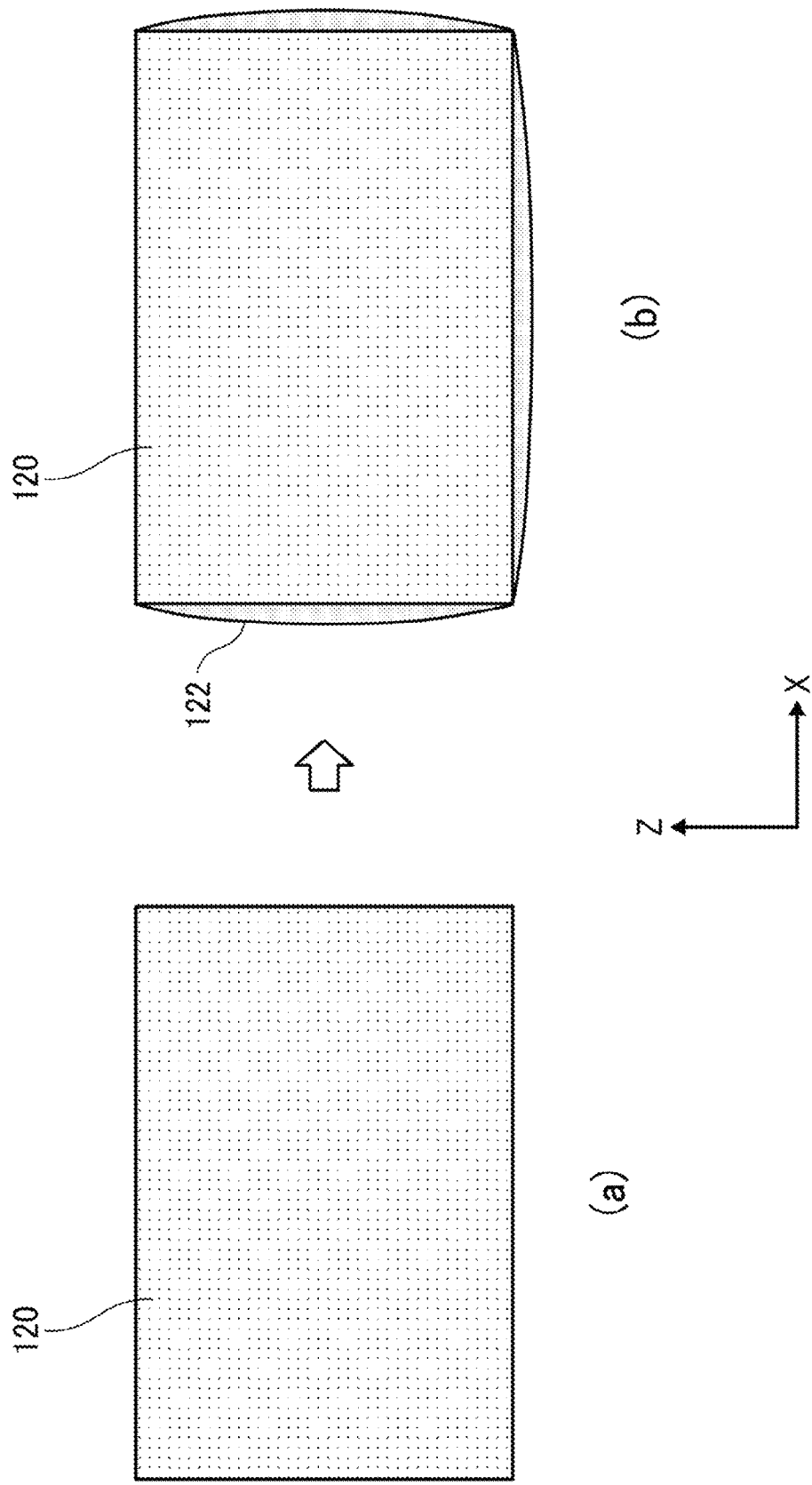

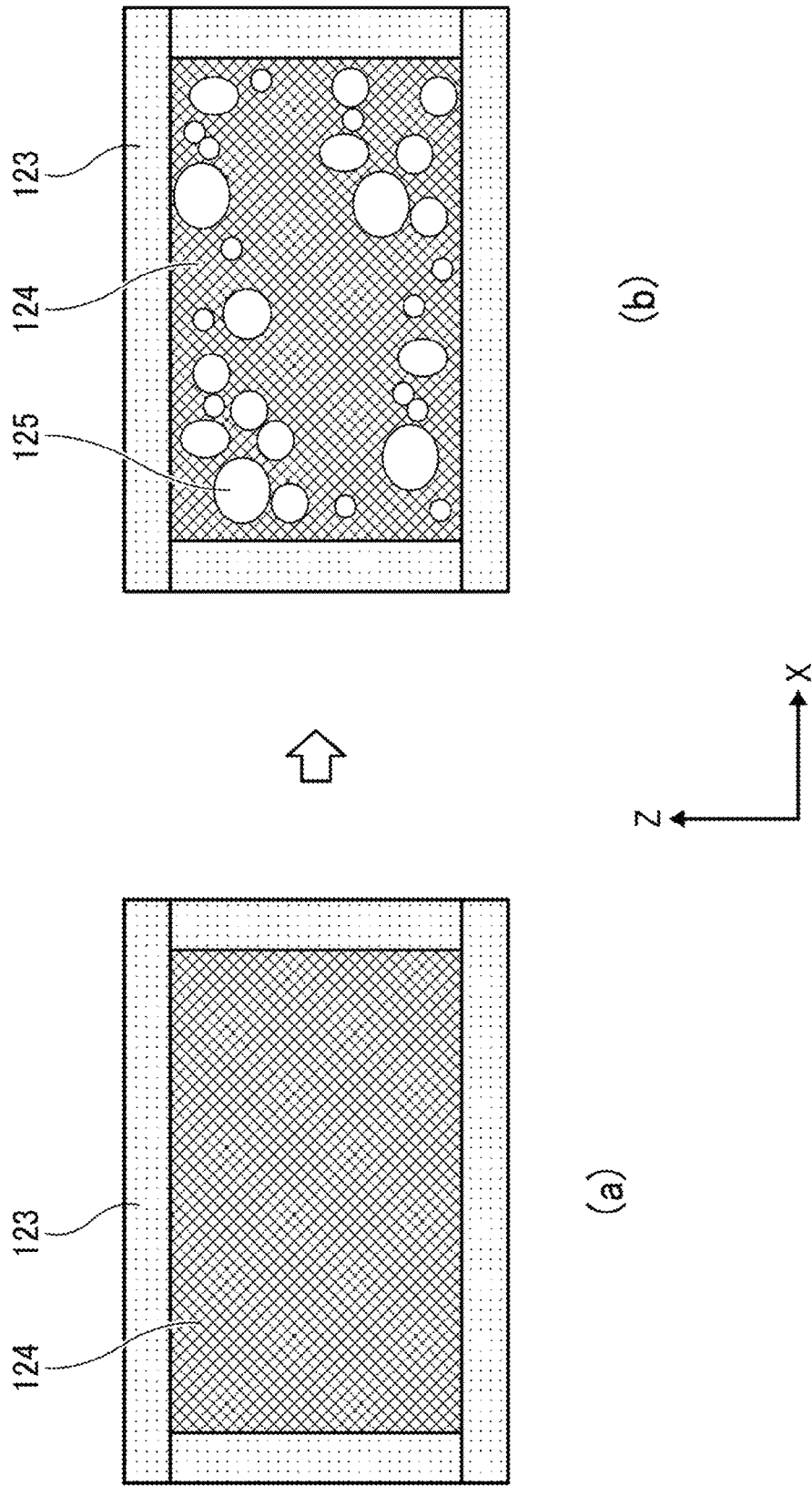

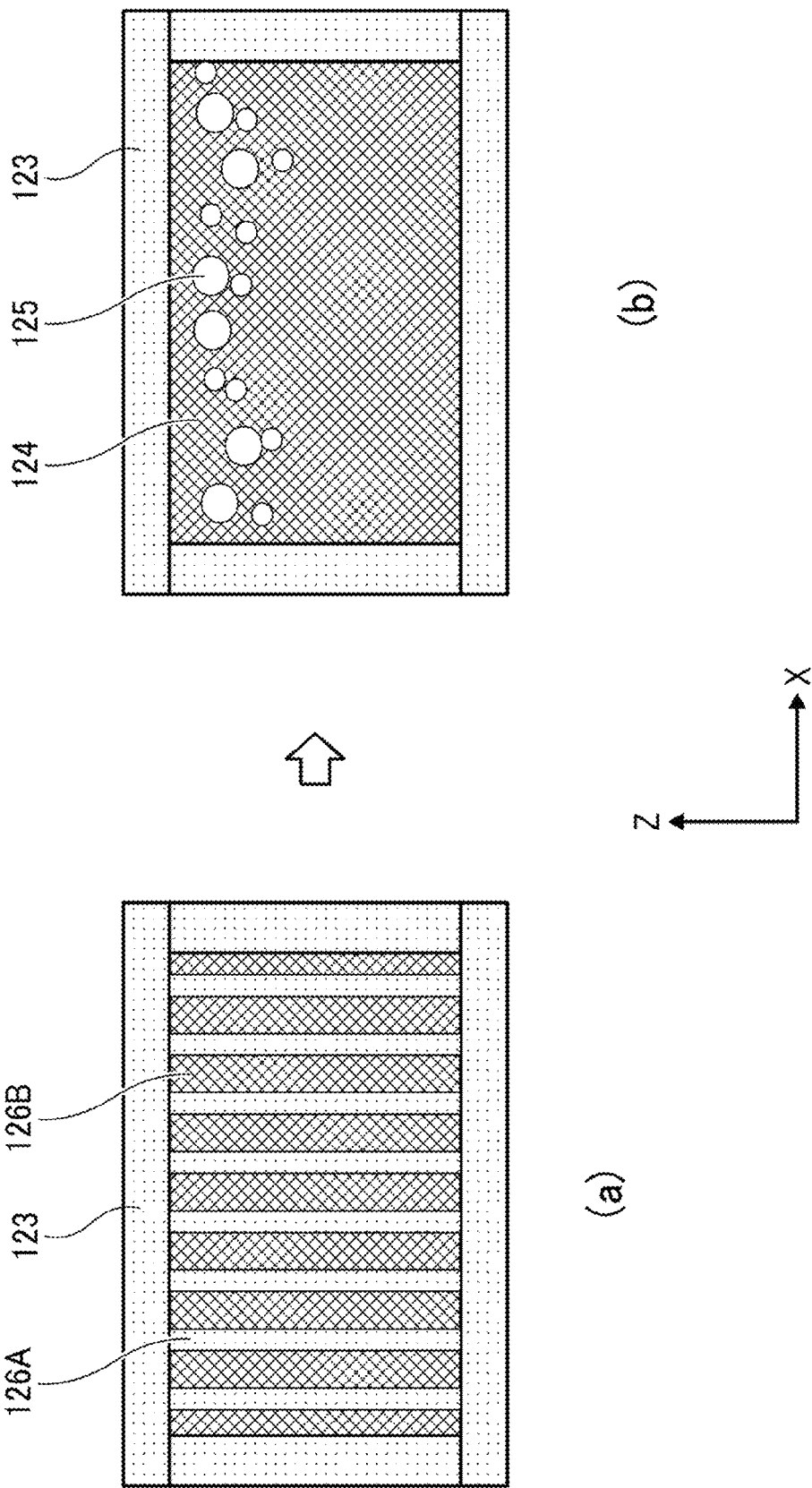

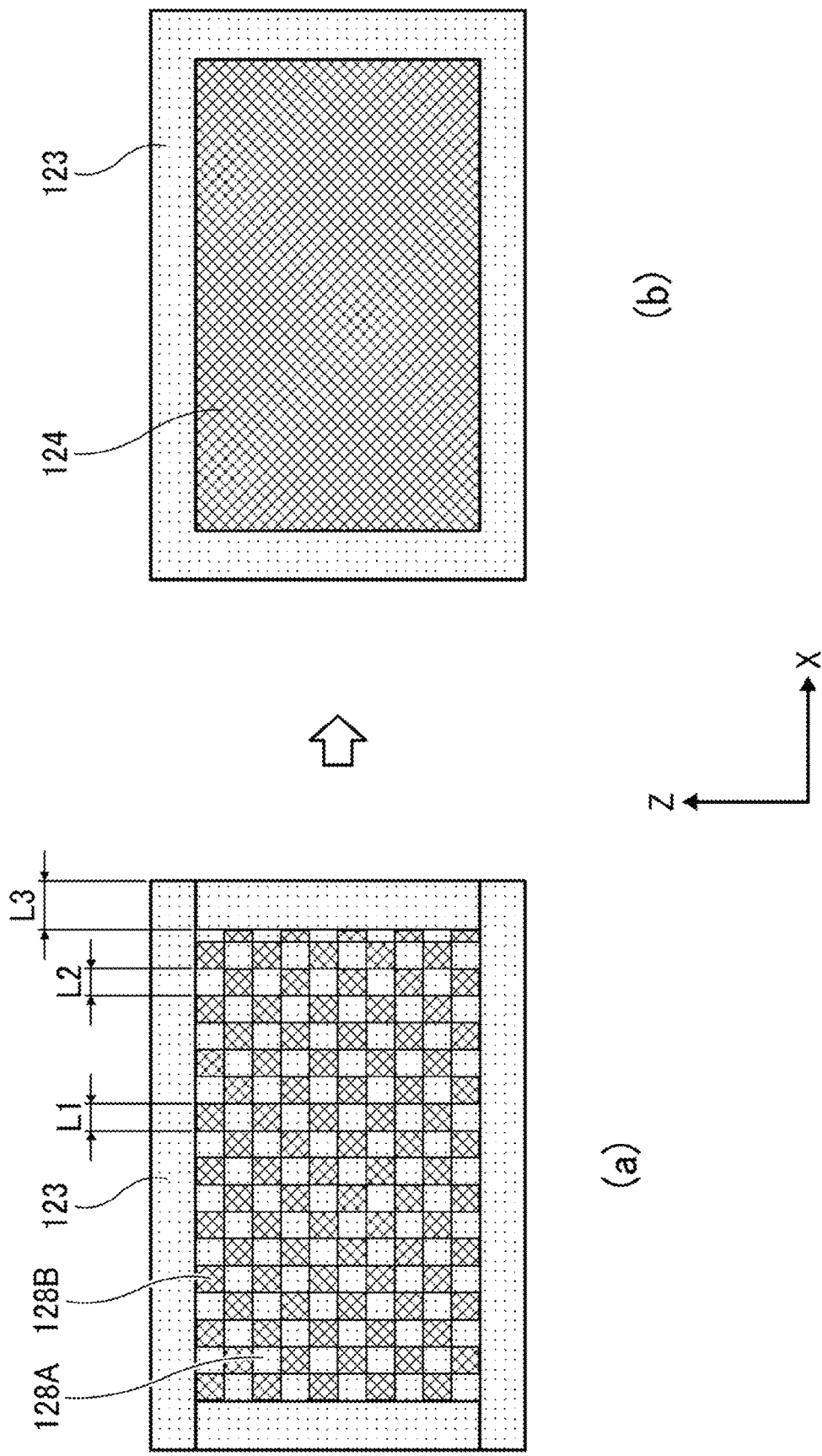

METHOD OF MANUFACTURING 3D MODELED OBJECT

CROSS-REFERENCE TO RELATED APPLICATIONS

The present application claims priority under 35 U.S.C. § 119 to Japanese Patent Application No. 2020-190724, filed on Nov. 17, 2020. The contents of which are incorporated herein by reference in their entirety.

BACKGROUND OF THE INVENTION

1. Field of the Invention

The disclosure relates to a method of manufacturing a 3D modeled object.

2. Description of the Related Art

Japanese Unexamined Patent Application Publication No. 2018-126912 describes a method of modeling a 3D modeled object in which the volume of a droplet of a modeling solution 10 that is ejected to an edge area of a modeling area is larger than the volume of a droplet of the modeling solution 10 that is ejected to other areas and the amount of the modeling solution 10 ejected to the edge area is larger than the amount of the modeling solution 10 ejected to another area.

U.S. Pat. No. 6,936,212 describes a three-dimensional object including an outer surface in a shell structure and an internal grid structure.

SUMMARY OF THE INVENTION

According to an aspect of the present invention, a method of manufacturing a 3D modeled object, includes modeling including applying a modeling solution to powder laid in layers, hardening the powder to which the modeling solution applied to form modeling layers, and sequentially stacking the modeling layers to form a 3D modeled object; and immersing the 3D modeled object modeled at the modeling in a removal solution to remove the powder to which the modeling solution is not applied. At the modeling, the modeling solution is applied such that a density of the modeling solution in an inside of the 3D modeled object is smaller than a density of the modeling solution in a surface of the 3D modeled object and an area of the powder to which the modeling solution is applied and an area of the powder to which the modeling solution is not applied are alternate in the inside of the 3D modeled object.

BRIEF DESCRIPTION OF THE DRAWINGS

FIG. 8 is an illustration of a removing step according to the embodiment;

FIG. 9 is an illustration of a 3D modeled object according to a comparative example of the disclosure;

FIG. 10 is an illustration of a 3D modeled object according to a second comparative example of the embodiment;

FIG. 11 is an illustration of the 3D modeled object according to the embodiment; and FIG. 12 is an illustration of a 3D modeled object according to a modification of the embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
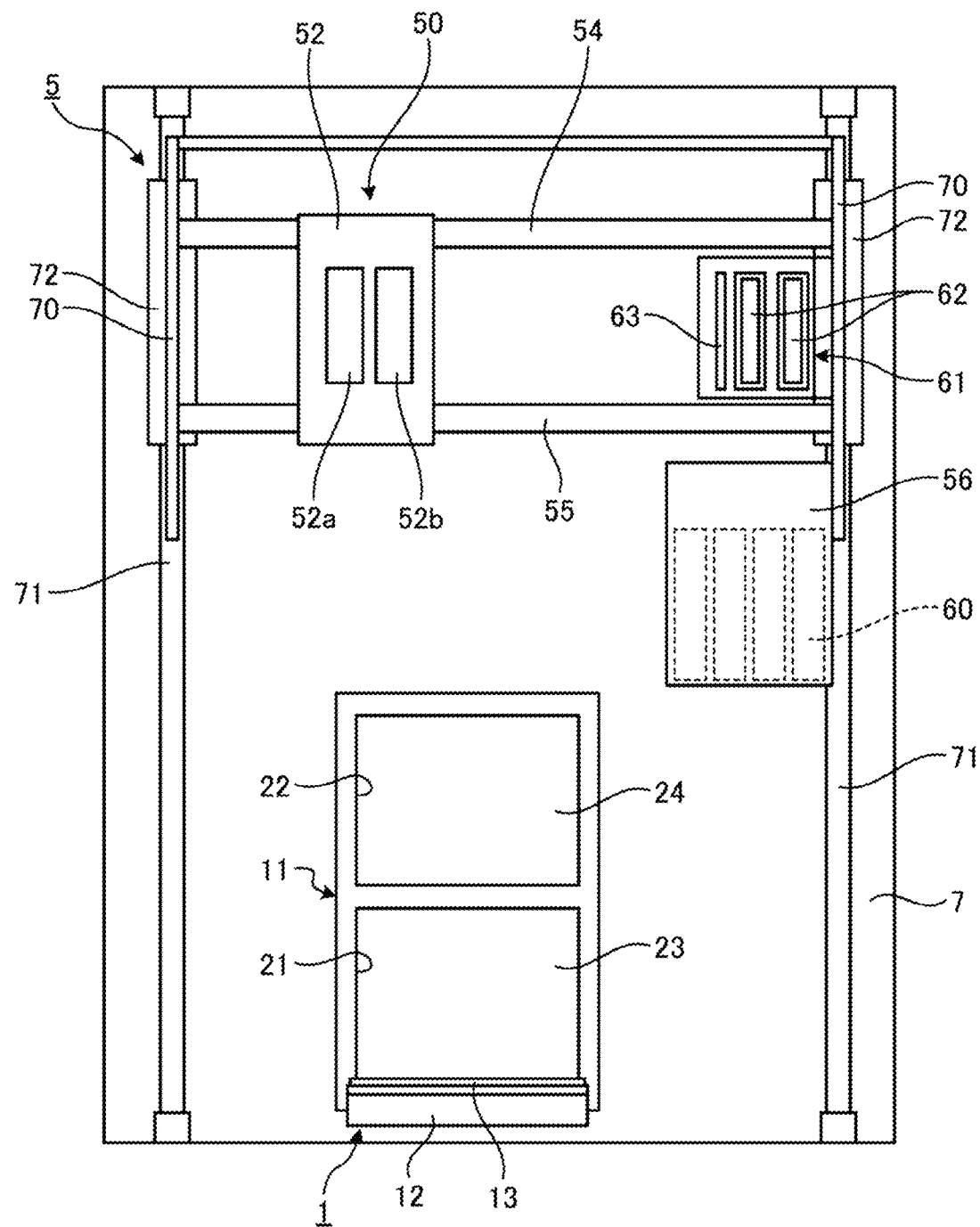
FIG. 1 is a schematic plane view of a 3D modeling apparatus according to an embodiment of the disclosure.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide a 3D modeled object that is modeled accurately and that has strength A 3D modeling apparatus (three-dimensional modeling apparatus) of an embodiment that models a 3D modeled object (three-dimensionally modeled object) by a laminate modeling method will be described as an example.

Configuration of 3D Modeling Apparatus

Figure 2:
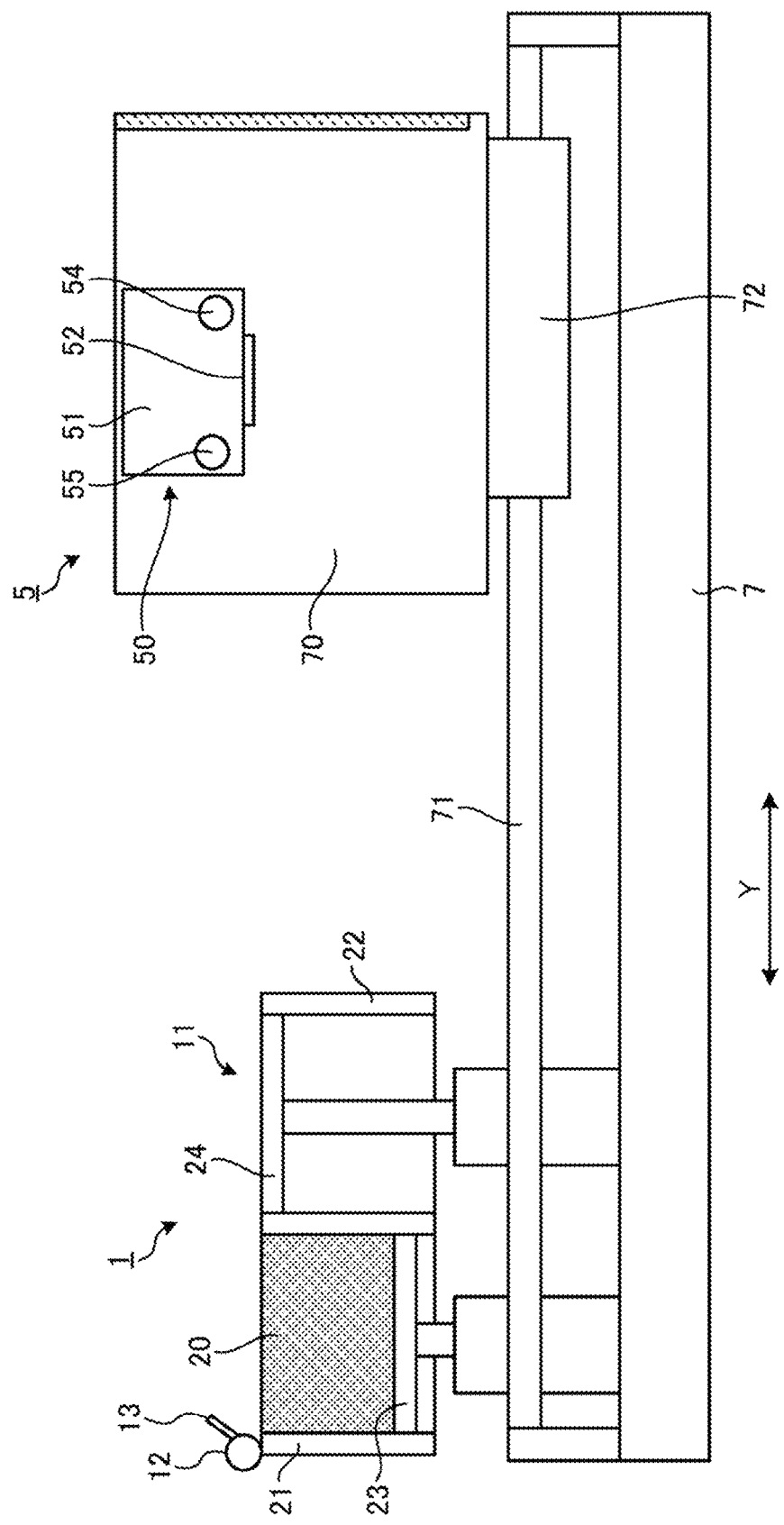
FIG. 2 is a schematic side view of the 3D modeling apparatus according to the embodiment.
Figure 3:
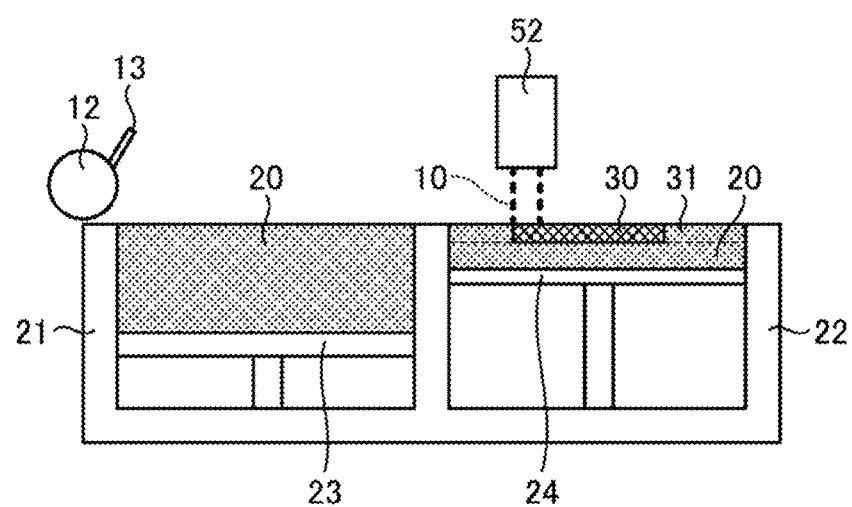
FIG. 3 is a cross-sectional view of a modeling part that is arranged in the 3D modeling apparatus according to the embodiment.
Figure 4:
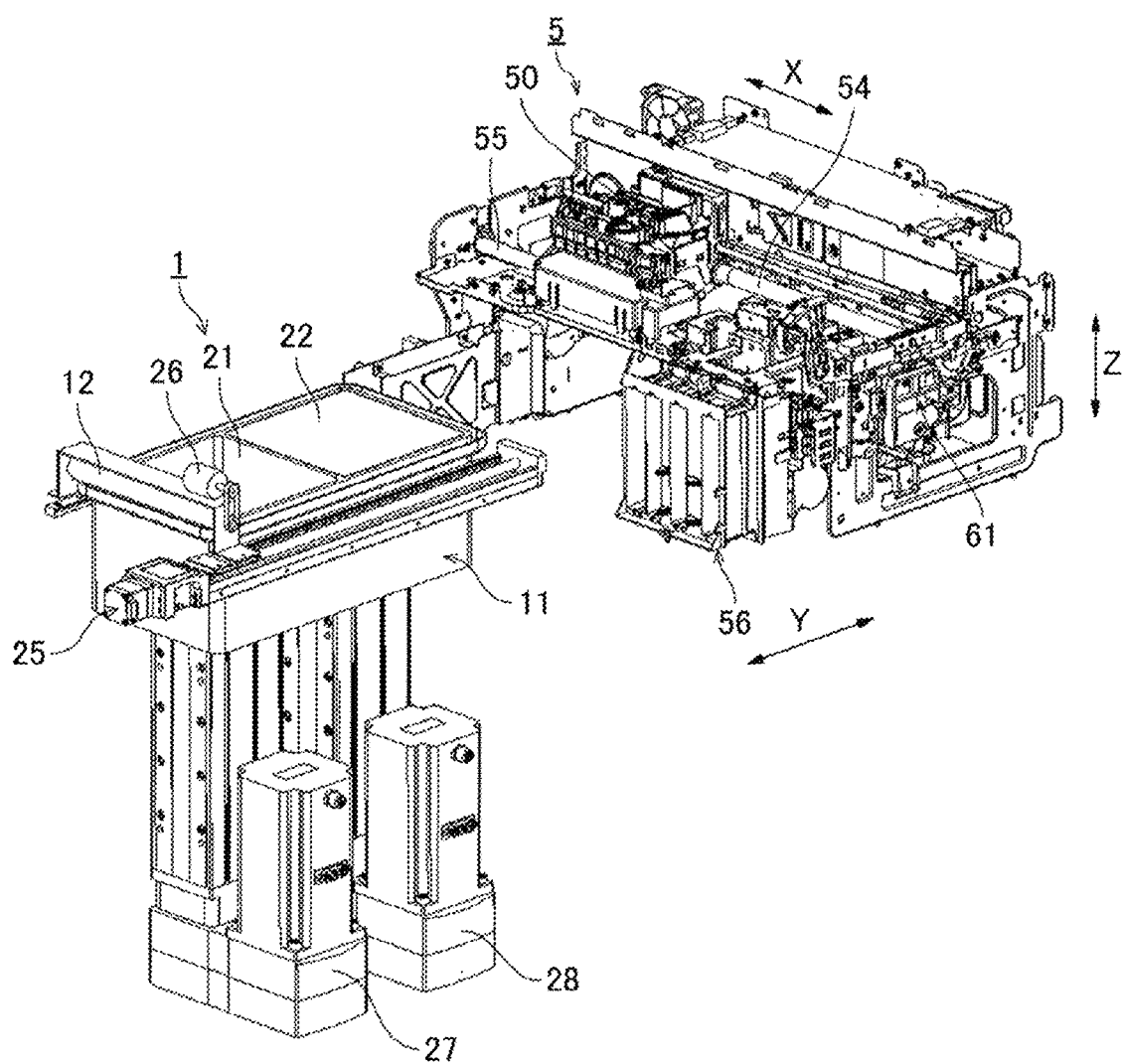
FIG. 4 is a perspective view of a principal part of the 3D modeling apparatus according to the embodiment.
Figure 5:
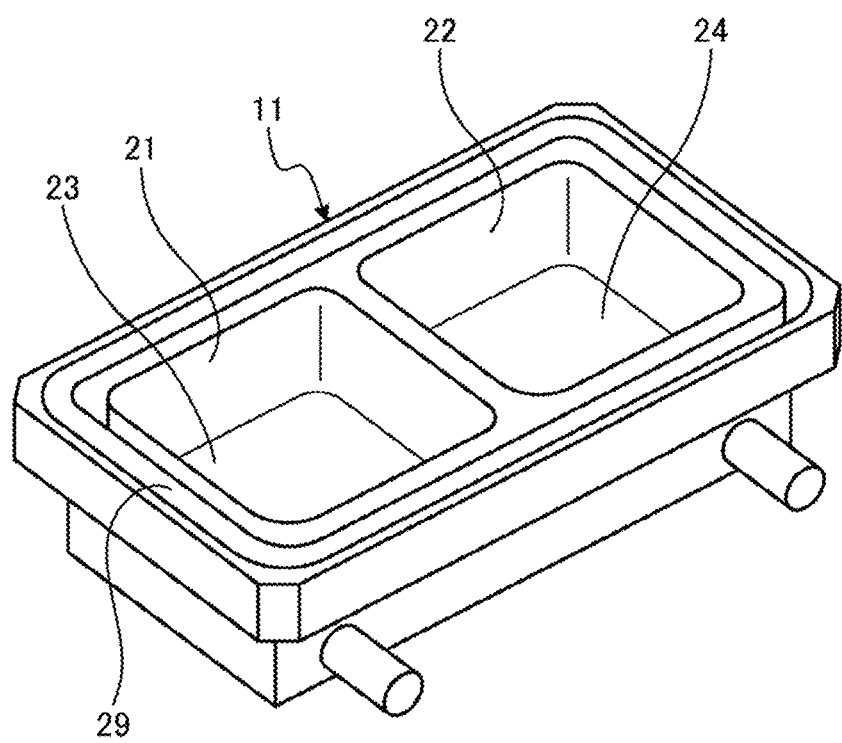
FIG. 5 is a perspective view of the modeling part that is arranged in the 3D modeling apparatus according to the embodiment.

FIG. 1 is a schematic plane view of a 3D modeling apparatus according to the embodiment of the disclosure. FIG. 2 is a schematic side view of the 3D modeling apparatus according to the embodiment. FIG. 3 is a cross-sectional view of a modeling part that is arranged in the 3D modeling apparatus according to the embodiment. FIG. 3 illustrates the state of modeling of a 3D modeled object. FIG. 4 is a perspective view of a principal part of the 3D modeling apparatus according to the embodiment. FIG. 5 is a perspective view of the modeling part that is arranged in the 3D modeling apparatus according to the embodiment.

The 3D modeling apparatus according to the embodiment includes a modeling part 1 where a modeling layer 30 that is a layered modeled object in which powder is bound is formed. The 3D modeling apparatus includes a modeling unit 5 that models a 3D modeled object by ejecting a modeling solution 10 to a powder layer 31 that is bedded in a layer in the modeling part 1.

The modeling part 1 includes a powder vessel 11 and a flattening roller 12 serving as a rotational member that is a flattening member (recoater). Instead of the rotational member, for example, a platy member (blade) may be arranged as the flattening member.

The powder vessel 11 includes a supply vessel 21 that supplies powder 20 and a modeling vessel 22 in which the modeling layers are stacked and a 3D modeled object is modeled. A bottom part of the supply vessel 21 serves as a supply stage 23 and is movable up and down along a vertical direction (height direction). Similarly, a bottom part of the modeling vessel 22 serves as a modeling stage 24 and is movable up and down along the vertical direction (height direction). On the modeling stage 24, a 3D modeled object obtained by tacking the modeling layers 30 is modeled.

A motor 27 causes the supply stage 23 to move up and down in a Z-direction (height direction) represented by an arrow in FIG. 4 and, similarly, a motor 28 causes the modeling stage 24 to move up and down in the Z-direction.

The flattening roller 12 is an example of the roller device and supplies, to the modeling vessel 22, the powder 20 that is supplied onto the supply stage 23 of the supply vessel 21 and flattens the powder 20, thereby forming the powder layer 31.

The flattening roller 12 is arranged in a Y-direction represented by an arrow in FIG. 4 along a stage surface of the modeling stage 24 (surface on which the powder 20 is laid). A reciprocation mechanism 25 causes the flattening roller 12 to reciprocate relatively to the stage surface. A motor 26 drives the flattening roller 12 to rotate in the counter direction against the travel direction.

On the other hand, the modeling unit 5 includes a liquid ejection unit 50 that selectively ejects multiple modeling solutions 10 to the powder layer 31 on the modeling stage 24. The liquid ejection unit 50 includes a carriage 51 and two (or one or three or more) liquid ejection heads (simply referred to as "heads" below) 52a and 52b that are arranged on the carriage 51.

The carriage 51 is supported movably by guide members 54 and 55. The guide members 54 and 55 and are held by side plates 70 on both sides movably up and down. An X-direction scanning mechanism 550 (see FIG. 6) to be described below causes the carriage 51 to reciprocate in an X-direction that is a main-scanning direction via a main-scanning move mechanism including a motor, a pulley, and a belt.

In each of the two heads 52a and 52b (referred to as "heads" when not particularly distinguished from each other), two nozzle arrays in each of which a plurality of nozzles that eject a solution are arrayed are arranged. The two nozzle arrays of the head 52a that is one of the heads 52 eject a modeling solution A and a modeling solution B, respectively. The two nozzle arrays of the head 52b that is the other head eject a modeling solution C and a modeling solution D, respectively. The head configuration is not limited to this.

The modeling solutions A, B, C and D may be the same or different solutions containing a cross-linker may be combined and the configuration is not limited.

A plurality of tanks 60 that store the modeling solution A, the modeling solution B, the modeling solution C, and the modeling solution D, respectively, are mounted on a tank mount unit 56 and the modeling solutions are supplied to the heads 52a and 52b via supply tubes, or the like.

On one side in the X-direction, a maintenance mechanism 61 that provides maintenance and recovery of the heads 52 of the liquid ejection unit 50 is arranged. The maintenance mechanism 61 mainly includes caps 62 and a wiper 63. The caps 62 are attached closely to nozzle surfaces (surfaces on which nozzles are formed) of the heads 52 to suck the modeling solution from the nozzles. This is for discharging the powder with which the nozzles are clogged and discharging the modeling solution in high viscosity.

Thereafter, the nozzle surfaces are wiped with the wiper 63 because of meniscus formation of the nozzles (the inside of the nozzles is in a negative-pressure state). When ejection of modeling solutions is not performed, the maintenance mechanism 61 covers the nozzle surfaces of the heads with the caps 62 to prevent the powder from entering the nozzles and prevent the modeling solutions 10 from drying.

The modeling unit 5 includes a slider unit 72 that is movably held by a guide member 71 that is arranged above a base member 7 and the whole modeling unit 5 is able to reciprocate in the Y-direction (sub-scanning direction) orthogonal to the X-direction. A Y-direction scanning mechanism 552 to be described below causes the whole modeling unit 5 to reciprocate in the Y-direction.

The liquid ejection unit 50 is arranged together with the guide members 54 such that the liquid ejection unit 50 is able to move up and down in the Z-direction and a Z-direction moving-up/down mechanism 551 causes the liquid ejection unit 50 to move up and down in the Z-direction.

Detailed Configuration of Modeling Part

The powder vessel 11 has a box shape and includes two vessels that are the supply vessel 21 and the modeling vessel 22 whose upper surfaces are open. The supply stage 23 is arranged in the supply vessel 21 such that the supply stage 23 is movable up and down and, similarly in the modeling vessel 22, the modeling stage 24 is arranged such that the modeling stage 24 is movable up and down. The relationship between a powder amount a1 that is supplied in the supply vessel 21 and the capacity (powder amount a2) of the modeling vessel 22 satisfies a relationship of "a1×1.01>a2".

The supply stage 23 is arranged such that the side surfaces of the supply stage 23 make contact with the inner surfaces of the supply vessel 21. The modeling stage 24 is arranged such that the side surfaces of the modeling stage 24 make contact with the inner surfaces of the modeling vessel 22. The upper surfaces of the supply stage 23 and the modeling stage 24 are kept horizontal.

Around the powder vessel 11, as illustrated in FIG. 5, a powder fall opening 29 that is concave with its upper surface being open is arranged. A surplus of the powder 20 that is supplied by the flattening roller 12 when forming the powder layer 31 falls in the powder fall opening 29. The surplus of the powder 20 having fallen in the powder fall opening 29 is brought back to a powder supply device that supplies the powder to the supply vessel 21.

A powder supply device 554 (see FIG. 6) to be described below is arranged above the supply vessel 21. At the initial operation of modeling or when the amount of the powder in the supply vessel 21 decreases, the powder in the tank configuring the powder supply device 554 is supplied to the supply vessel 21. As a powder delivery method for supplying powder, a screw conveyer system utilizing a screw, an air transport system utilizing air, etc., are exemplified.

The flattening roller 12 transfers and supplies the powder 20 from the supply vessel 21 to the modeling vessel 22 and smooths the surface of the powder 20 to flatten the powder 20, thereby forming the powder layer 31 that is layered powder in a given thickness. The flattening roller 12 is a rod member longer than the inside dimension of the modeling vessel 22 and the supply vessel 21 (in other words, the part to which the powder is supplied or the part in which the powder is stored) and the reciprocation mechanism 25 causes the flattening roller 12 to reciprocate in the Y-direction (sub-scanning direction) along the stage surface.

In the state of being driven to rotate by the motor 26, the flattening roller 12 moves horizontally such that the flattening roller 12 passes over the supply vessel 21 and the modeling vessel 22 from the outside of the supply vessel 21. Accordingly, the powder 20 is transferred and supplied above the modeling vessel 22 and the flattening roller 12 flattens the powder 20 while passing over the modeling vessel 22, so that the powder layer 31 is formed.

As illustrated also in FIG. 2, a powder removal blade 13 for removing the powder 20 that is attached to the flattening roller 12, making contact with the circumferential surface of the flattening roller 12, is arranged. In the state of making contact with the circumferential surface of the flattening roller 12, the powder removal blade 13 moves together with the flattening roller 12 and removes the powder 20 that is attached to the flattening roller 12.

The powder vessel 11 of the modeling part 1 includes two vessels that are the supply vessel 21 and the modeling vessel 22. Alternatively, a configuration in which the powder vessel 11 includes the modeling vessel 22 only and a configuration in which the powder is supplied from the powder supply device to the modeling vessel 22 and a flattening unit flattens the powder may be employed.

Electric Configuration of 3D Modeling Apparatus

Figure 6:
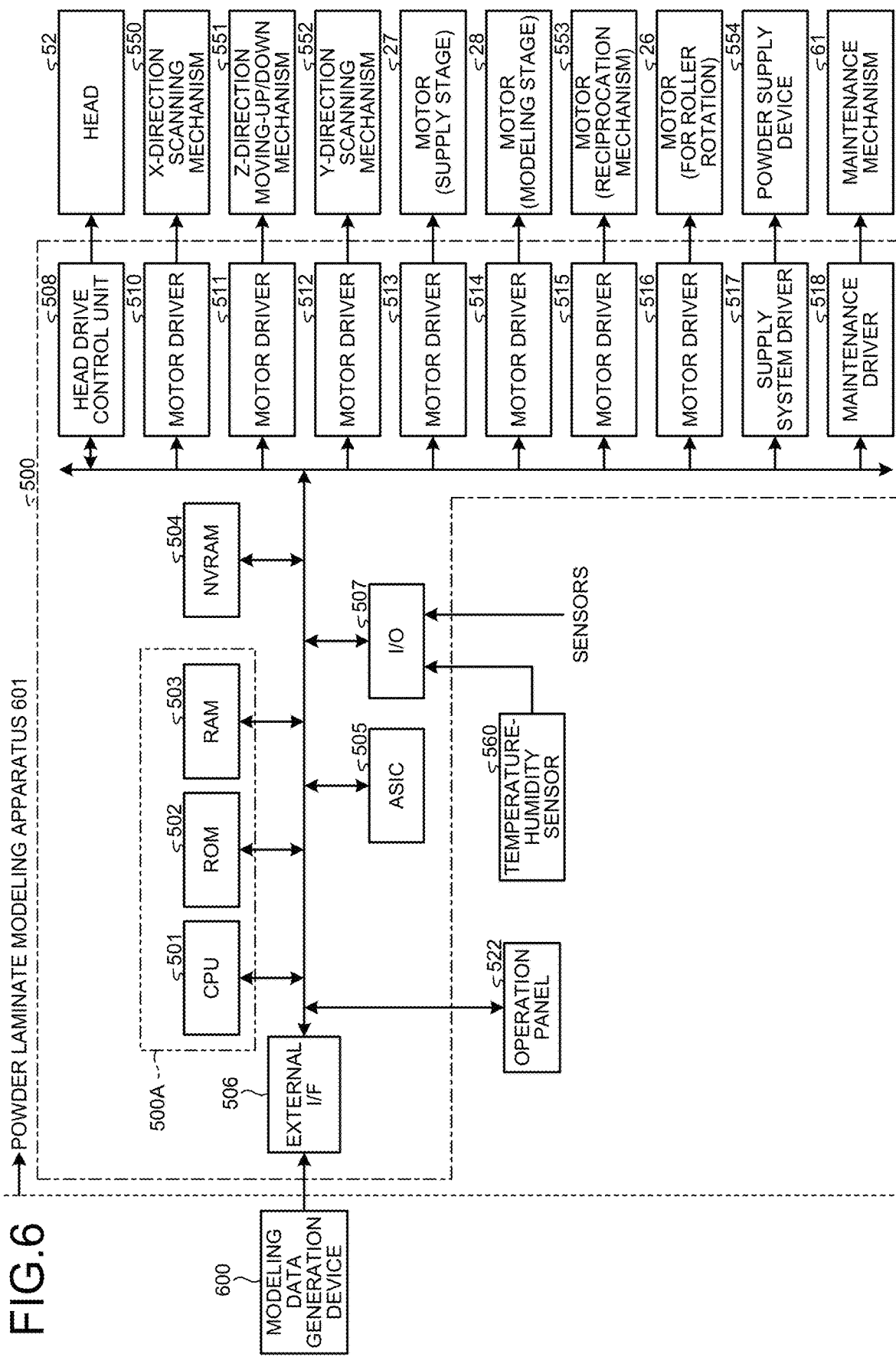
FIG. 6 is a block diagram of the 3D modeling apparatus according to the embodiment.

FIG. 6 represents a block diagram of the 3D modeling apparatus according to the embodiment. In FIG. 6, a control unit 500 includes a main control unit 500A including a CPU 501 that generally controls the 3D modeling apparatus, a ROM 502 that stores programs for causing the CPU 501 to execute 3D modeling control and other fixed data, and a RAM 503 that temporarily stores modeling data, etc.

The control unit 500 includes a non-volatile memory (NVRAM) 504 for storing data even when the power of the apparatus is off. The control unit 500 further includes an ASIC 505 that processes input/output signals for controlling image processing of performing various types of signal processing on image data and further controlling the apparatus generally.

The control unit 500 includes an I/F 506 for transmitting and receiving data and signals that are used to receive modeling data from an external modeling data generation device 600. The modeling data generation device 600 is a device that generates modeling data of layers of a modeled object of a final form into which the modeled object is sliced and an information processing device, such as a personal computer, is usable.

The control unit 500 includes an I/O 507 for loading sensing signals of various sensors. The control unit 500 includes a head drive control unit 508 that controls driving of each head 52 of the liquid ejection unit 50. The control unit 500 includes a motor driver 510 that drives a motor configuring the X-direction scanning mechanism 550 that causes the carriage 51 of the liquid ejection unit 50 to move in the X-direction (main-scanning direction) and a motor driver 512 that drives a motor configuring the Y-direction scanning mechanism 552 that causes the modeling unit 5 to move in the Y-direction (sub-scanning direction).

The control unit 500 includes a motor driver 511 that drives a motor configuring the Z-direction moving-up/down mechanism 551 that causes the carriage 51 of the liquid ejection unit 50 to move (move up/down) in the Z-direction. As for moving up/down in the Z-direction, a configuration in which the entire modeling unit 5 is moved up and down may be employed.

The control unit 500 includes a motor driver 513 that drives the motor 27 that causes the supply stage 23 to move up and down and a motor driver 514 that drives the motor 28 that causes the modeling stage 24 to move up and down. The control unit 500 includes a motor driver 515 that drives a motor 553 of the reciprocation mechanism 25 that causes the flattening roller 12 to move and a motor driver 516 that drives the motor 26 that drives the flattening roller 12 to rotate.

The control unit 500 includes a supply driver 517 that drives the powder supply device 554 that supplies the powder 20 to the supply vessel 21 and a maintenance driver 518 that drives the maintenance mechanism 61 of the liquid ejection unit 50. Sensing signals of a temperature-humidity sensor 560 that detects a temperature and a humidity as an environment condition of the apparatus, or the like, and sensing signals of other sensors are input to the I/O 507 of the control unit 500. An operation panel 522 for making inputs and displays of information necessary for the apparatus is connected the control unit 500.

The modeling data generation device 600 and the 3D modeling apparatus (powder laminate modeling apparatus) 601 configure a 3D modeling system.

Modeling Operations

Figure 7:
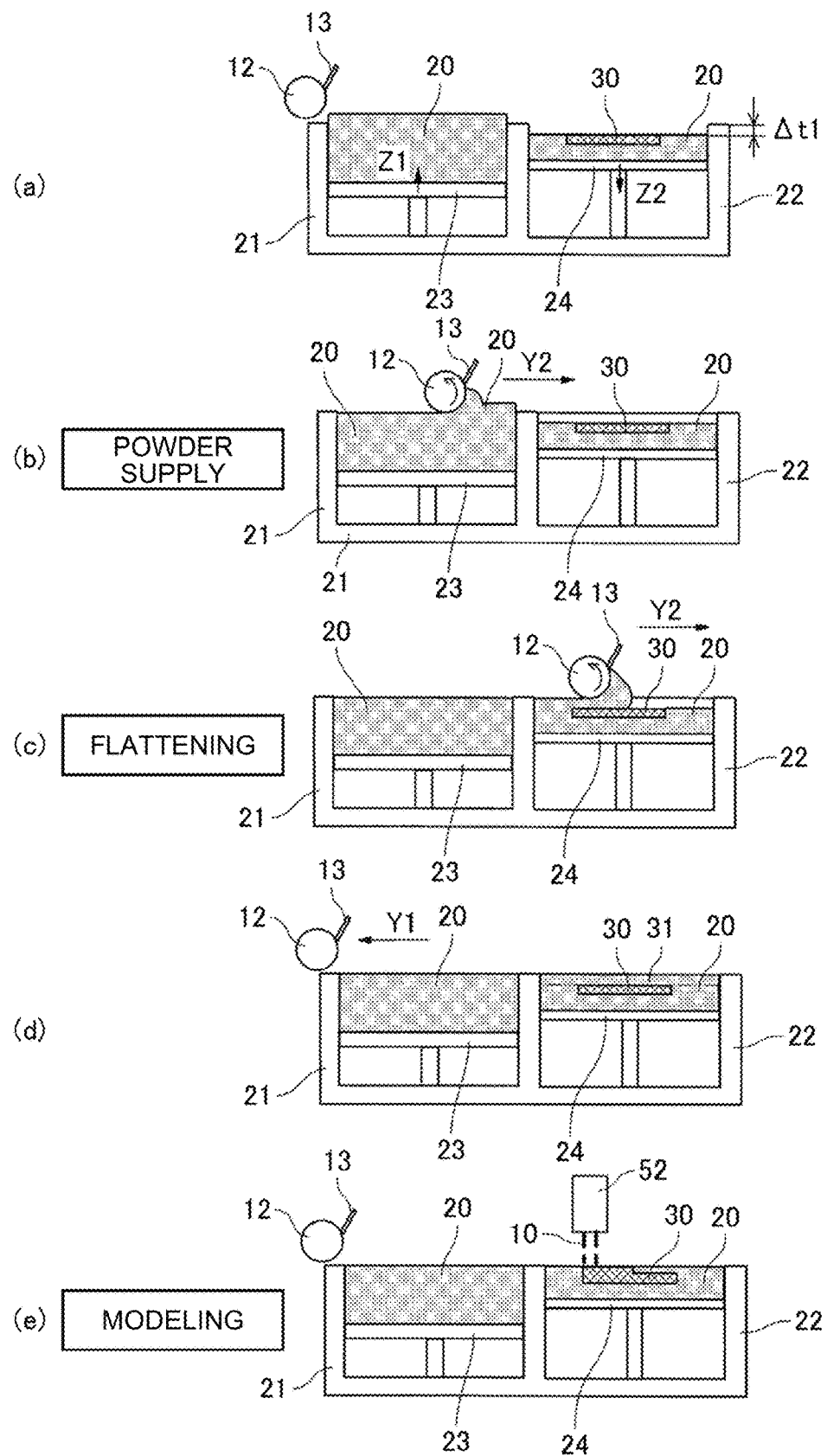
FIG. 7 is a schematic diagram for describing operations of modeling a 3D modeled object performed by the 3D modeling apparatus according to the embodiment.

FIG. 7 is a schematic diagram for describing operations of modeling a 3D modeled object performed by the 3D modeling apparatus according to the embodiment. FIG. 7 illustrates an example of a modeling step according to the embodiment. FIG. 7 illustrates, at (a), a state where a modeling layer 30 of the first layer is formed on the modeling stage 24 of the modeling vessel 22. When the modeling layer 30 of the next layer is formed on the modeling layer 30 in that state, as illustrated at (a) in FIG. 7, the supply stage 23 of the supply vessel 21 is caused to move up in a Z1-direction and the modeling stage 24 of the modeling vessel 22 is caused to move down in a Z2-direction.

A distance by which the modeling stage 24 moves down is set such that the interval between the upper surface of the modeling vessel 22 (powder layer surface) and the bottom of the flattening roller 12 (lower connector) is Δt1. The interval Δt1 corresponds to the thickness of the powder layer 31 to be formed next. For example, the interval Δt1 is around few tens of millimeters to 100 μm.

Next, as illustrated at (b) in FIG. 7, the powder 20 that is positioned above the upper surface level of the supply vessel 21 is moved in a Y2-direction (the side of the modeling vessel 22) by the flattening roller 12 that is driven to rotate in a forwarding direction (the direction of the arrow). Accordingly, the powder 20 is transferred and supplied to the modeling vessel 22 (powder supply).

Furthermore, as illustrated at (c) in FIG. 7, the flattening roller 12 is moved in parallel with the stage surface of the modeling stage 24 of the modeling vessel 22 and, as illustrated at (d) in FIG. 7, the powder layer 31 in the given thickness Δt1 is formed on the modeling layer 30 on the modeling stage 24 (flattening). After forming the powder layer 31, as illustrated at (d) in FIG. 7, the flattening roller 12 is moved in the Y1-direction and is returned to the initial position.

The flattening roller 12 is movable with the distance between the modeling vessel 22 and the upper surface level of the supply vessel 21 kept constant. This makes it possible to, while delivering the powder 20 onto the modeling vessel 22 with the flattening roller 12, form the powder layer 31 in the uniform thickness Δt1 on the modeling vessel 22 or the modeling layer 30 that has been already formed.

Thereafter, as illustrated at (e) in FIG. 7, droplets of the modeling solution 10 are ejected from the heads 52 of the liquid ejection unit 50 and are applied, thereby forming the modeling layer 30 so as to be stacked in the powder layer 31 of the next layer (modeling).

The modeling layer 30 is formed, for example, in a way that the modeling solution 10 that is ejected from the heads 52 is mixed with the powder 20, an adhesive contained in the powder 20 thus dissolves, the dissolved adhesive is bonded, and thus the powder 20 is bound.

Next, the above-described step of forming the powder layer 31 by supplying and flattering powder and the step of ejecting the modeling solution performed by the heads 52 are repeated to form the modeling layer 30 of a new layer. The modeling layer 30 of the new layer and the modeling layer 30 under the new modeling layer are integrated, thereby forming part of a three-dimensionally-shaped modeled object.

Thereafter, the step of forming the powder layer 31 by supplying and flattering powder and the step of ejecting the modeling solution performed by the heads 52 are repeated for a required number of times, thereby completing a three-dimensionally-shaped modeled object (3D modeled object). In other words, the modeling solution 10 is applied to the powder 20 that is laid in a layer, the powder 20 to which the modeling solution 10 is applied is hardened to form the modeling layer 30, and the modeling layers 30 are stacked sequentially to model a 3D modeled object.

Powder Material for 3D Modeling

An example of a powder material (powder) for 3D modeling that is used in the 3D modeling apparatus and the modeling solution will be described next. Note that the powder and the modeling solution are not limited to those described below.

The powder material for 3D modeling includes a base material and a dissolvable organic material that coats, in an average thickness of 5 nm to 1000 nm, the base material, that is dissolvable and cross-linkable because of the effect of the solution containing a cross-linker serving as the modeling solution. In the powder material for 3D modeling, because the dissolvable organic material coating the base material is dissolvable and cross-linkable because of the effect of a solution containing a cross-linker, when the solution containing the cross-linker is applied to the dissolvable organic material, the dissolvable organic material dissolves and cross-links because of the effect of the cross-linker contained in the solution containing the cross-linker.

A thin layer (powder layer) is formed using the above-described powder material for 3D modeling and the solution containing the cross-linker is ejected as the modeling solution 10 onto the powder layer and accordingly the dissolvable organic material having dissolved cross-links in the powder layer and, as a result, the powder layer binds and cures, so that the modeling layer 30 is formed.

The average thickness of the dissolvable organic material coating the base material is 5 nm to 1000 nm and thus, when the dissolvable organic material dissolves, only a minimum necessary amount of the dissolvable organic material is present around the base material, cross-links, and forms a three-dimensional network, so that the powder layer is hardened in accurate dimensions with a preferable strength.

Repeating this operation makes it possible to form a complicated 3D modeled object in accurate dimensions simply and efficiently without losing shape before sintering, or the like.

The dissolvable organic material may be present in the powder and a modeled object may be formed by applying the modeling solution that causes the dissolvable organic material to cross-link and bind or the dissolvable organic material may be mixed with the base material without coating the base material with the dissolvable organic material. The powder 20 may consist of only the base material and the dissolvable organic material may be contained in the modeling solution and be applied to form a modeled object.

Base Material

The base material is not particularly limited as long as the base material is in a form of powder or particles, and it is selectable as appropriate according to the purpose. For example, metal, ceramics, carbon, polymer, etc., are exemplified as the quality of material and, in view of obtaining a 3D modeled object with high strength, metal on which sintering processing can be performed eventually, such as ceramics, is preferable.

As metal, for example, stainless (SUS) steel, iron, copper, titanium, silver, aluminum, etc., are exemplified preferably and, as stainless (SUS) steel, for example, SUS316L, etc., are exemplified.

As ceramics, for example, a metal oxide, etc., are exemplified and, specifically, silica ($SiO_2$), alumina ($Al_2O_3$), zirconia ($ZrO_2$), titania ($TiO_2$), etc., are exemplified.

As carbon, for example, graphite, graphene, carbon nanotube, carbon nanohorn, fullerene, etc., are exemplified.

A single type or the materials may be used or at least two types may be used together. For the purpose of increasing affinity with the dissolvable organic material, or the like, known surface (property modification) processing may be performed on the base material.

Dissolvable Organic Material

As the dissolvable organic material, one that dissolves into the modeling solution and has properties enabling cross-link because of the effect of the cross-linker is usable. In other words, the dissolvable organic material is not particularly limited as long as the dissolvable organic material is dissolvable into the modeling solution and is capable of cross-link by the cross-linker, and the dissolvable organic material is selectable as appropriate according to the purpose. As the dissolvable organic material, for example, polyvinyl alcohol or polyacrylic acid is usable.

Solutions Containing Cross-Linker

The solution containing a cross-linker serving as the modeling solution is not particularly limited as long as the solution contains a cross-linker in a liquid medium and the solution containing a cross-linker is selectable as appropriate according to the purpose. Note that the solution containing a cross-linker may contain, in addition to the liquid medium and the cross linker, other components that are selected appropriately as required.

Other components are selectable as appropriate in consideration of the type of the unit that applies the solution containing a cross-linker and conditions, such as the frequency of use or the volume. For example, when the solution containing a cross-linker is applied by a liquid ejection method, it is possible to select the solution in consideration of the effect of clogging the nozzles of the liquid ejection heads.

FIG. 8 is an illustration of a removing step according to the embodiment. A 3D modeled object 101 that is modeled at the modeling step illustrated in FIG. 7 is taken out of the modeling vessel 22 as a modeled body 100 together with surplus powder 102. The surplus powder 102 is the powder 20 to which the modeling solution 10 is not applied. In order to take the 3D modeled object 101 out of the modeled body 100, the modeled body 100 is immersed in a removal solution 104 with which a surplus powder removal vessel 103 is filled. Accordingly, the 3D modeled object 101 with the surplus powder 102 having been removed can be taken out.

FIG. 9 is an illustration of a 3D modeled object according to a comparative example of the disclosure. FIG. 9 illustrates, at (a), a cross-section 120 of the 3D modeled object 101 that is modeled at the modeling step illustrated in FIG. 7, which is a cross section orthogonal to a direction in which the modeling solution 20 is ejected. FIG. 9 illustrates, at (b), the cross-section 120 of the 3D modeled object 101 after the removing step illustrated in FIG. 8, which is the same cross-section as that illustrated at (a) in FIG. 9.

In the comparative example illustrated in FIG. 9, at the modeling step illustrated in FIG. 7, the modeling solution 10 is applied such that the density of the modeling solution 10 in the inside of the 3D modeled object 101 is the same as the density of the modeling solution 10 in the surface of the 3D modeled object 101.

Accordingly, as illustrated at (b) in FIG. 9, the modeling solution 10 seeps into the outside during modeling and a modeling solution seeping part 122 occurs, which decreases accuracy of modeling the 3D modeled object 101.

FIG. 10 is an illustration of a 3D modeled object according to a second comparative example of the embodiment. FIG. 10 illustrates, at (a), a cross-section of the 3D modeled object 101 that is modeled at the modeling step illustrated in FIG. 7, which is a cross-section orthogonal to the direction in which the modeling solution 20 is ejected. FIG. 10 illustrates, at (b), a cross-section of the 3D modeled object 101 after the removing step illustrated in FIG. 8, which is the same cross section as that illustrated at (a) in FIG. 10.

In the second comparative example illustrated in FIG. 10, at the modeling step illustrated in FIG. 7, the modeling solution 10 is not ejected to an inside 124 of the 3D modeled object 101. In other words, at the modeling step illustrated in FIG. 7, a density of the modeling solution in the inside 124 of the 3D modeled object 101 is smaller than a density of the modeling solution 10 in a surface 123 of the 3D modeled object 101.

Thus, as illustrated at (b) in FIG. 10, the modeling solution 10 does not seep into the outside of the 3D modeled object 101 during modeling, which reduces the decrease in accuracy of modeling the 3D modeled object 101.

The density of the modeling solution 10 over the inside 124 of the 3D modeled object 101 need not necessarily be smaller than the density of the modeling solution 10 in the surface 123 of the 3D modeled object 101 and the density of the modeling solution 10 in part of the inside 124 of the 3D modeled object 101 may be equal to the density of the modeling solution 10 in the surface 123 of the 3D modeled object 101.

Accordingly, for example, when the 3D modeled object 101 has a thin part, maintaining the density of the modeling solution 10 in the inside of the thin part equal to the density of the modeling solution 10 in the surface of the thin part reduces the reduction of the strength of the thin part.

On the other hand, as illustrated at (b) in FIG. 10, an empty space 125 may occur in the inside 123 of the 3D modeled object 101 because the density of the modeling solution 10 in the inside 124 of the 3D modeled object 101 is smaller than the density of the modeling solution 10 in the surface 123 of the 3D modeled object 101.

FIG. 11 is an illustration of the 3D modeled object according to the embodiment. FIG. 11 illustrates, at (a), a cross-section of the 3D modeled object 101 that is modeled at the modeling step illustrated in FIG. 7, which is a cross-section orthogonal to the direction in which the modeling solution 20 is ejected. FIG. 11 illustrates, at (b), a cross-section of the 3D modeled object 101 after the removing step illustrated in FIG. 8, which is the same cross-section as that illustrated at (a) in FIG. 11.

According to the embodiment illustrated in FIG. 11, in the modeling step illustrated in FIG. 7, the modeling solution 10 is applied such that the density of the modeling solution 10 in the inside 124 of the 3D modeled object 101 is smaller than the density of the modeling solution 10 in the surface 123 of the 3D modeled object 101. Furthermore, in the modeling step illustrated in FIG. 7, the modeling solution 10 is applied such that areas 126A of the powder 20 to which the modeling solution 10 is applied in the inside of the 3D modeled object 101 and areas 126B of the powder 20 to which the modeling solution 10 is not applied are alternate.

Accordingly, as illustrated at (b) in FIG. 11, because the density of the modeling solution 10 in the inside 124 of the 3D modeled object 101 is smaller than the density of the modeling solution 10 in the surface 123 of the 3D modeled object 101, occurrence of the empty space 125 in the inside 124 of the 3D modeled object 101 is reduced and the decrease in the strength of the 3D modeled object 101 is reduced.

FIG. 12 is an illustration of a 3D modeled object according to a modification of the embodiment. FIG. 12 illustrates, at (a), a cross-section of the 3D modeled object 101 that is modeled at the modeling step illustrated in FIG. 7, which is a cross-section orthogonal to the direction in which the modeling solution 20 is ejected. FIG. 12 illustrates, at (b), a cross-section of the 3D modeled object 101 after the removing step illustrated in FIG. 8, which is the same cross-section as that illustrated at (a) in FIG. 12.

In the modification illustrated in FIG. 12, at the modeling step illustrated in FIG. 7, the modeling solution 10 is applied such that the density of the modeling solution 10 in the inside 124 of the 3D modeled object 101 is smaller than the density of the modeling solution 10 in the surface 123 of the 3D modeled object 101.

In the modeling step illustrated in FIG. 7, the modeling solution 10 is applied such that areas 128A of the powder 20 to which the modeling solution 10 is applied and areas 128B of the powder 20 to which the modeling solution 10 is not applied are in a grid in the inside 124 of the 3D modeled object 101. Specifically, in the modeling step illustrated in FIG. 7, the modeling solution 10 is applied such that the density of the modeling solution 10 in the inside of the 3D modeled object 101 is uniform. Accordingly, even when the empty spaces 125 occur in the inside 124 of the 3D modeled object 101, local occurrence of the empty space 125 that is large is reduced and thus the decrease in strength of the 3D modeled object 101 is reduced.

Furthermore, in the modeling step illustrated in FIG. 7, the modeling solution 10 is applied such that a size L1 of the area 128B of the powder 20 to which the modeling solution 10 is not applied in the inside 124 of the 3D modeled object 101 is smaller than L below:

$$L1 = D \cdot (1/T - R)^{1/3}$$

where D denotes a particle diameter of the powder 20, T denotes a tap density of the powder 20, and R denotes a density of the 3D modeled object 101 that is modeled at the modeling step.

Accordingly, as illustrated at (b) in FIG. 12, occurrence of the empty space 125 in the inside 124 of the 3D modeled object 101 is reduced as much as possible.

At the modeling step illustrated in FIG. 7, the modeling solution 10 is applied such that a size L2 of the area 128A of the powder 20 to which the modeling solution 10 is applied in the inside 124 of the 3D modeled object 101 is smaller than a size L3 of the area 123 of the powder 20 to which the modeling solution 10 is applied in the surface 123 of the 3D modeled object 101.

Accordingly, the configuration in which the areas of the powder 20 to which the modeling solution 10 is applied and areas of the powder 20 to which the modeling solution 10 is not applied are alternate or in a grid in the inside 124 of the 3D modeled object 101 results in reduction of the decrease in strength of the surface 123 of the 3D modeled object 101.

Summary

As described above, a method of manufacturing a 3D modeled object according to the embodiment of the disclosure includes modeling the 3D modeled object 101 by forming the modeling layer 30 in a way that the modeling solution 10 is applied to the powder 20 that is laid in a layer and the powder 20 to which the modeling solution 10 is applied is hardened and by sequentially stacking the modeling layers 30; and removing the powder 20 to which the modeling solution 10 is not applied by immersing the 3D modeled object 101 that is modeled at the modeling in the removal solution 104, wherein the modeling includes applying the modeling solution 10 such that the density of the modeling solution 10 in the inside 124 of the 3D modeled object 101 is smaller than the density of the modeling solution 10 in the surface 123 of the 3D modeled object 101.

This reduces the decrease in accuracy of modeling the 3D modeled object 101 that is caused because the modeling solution 10 seeps into the outside of the 3D modeled object 101 during modeling.

Note that the density of the modeling solution 10 over the inside 124 of the 3D modeled object 101 need not necessarily be smaller than the density of the modeling solution 10 in the surface 123 of the 3D modeled object 101, and the density of the modeling solution 10 in part of the inside 124 of the 3D modeled object 101 may be equal to the density of the modeling solution 10 in the surface 123 of the 3D modeled object 101.

Accordingly, for example, when the 3D modeled object 101 has a thin part, maintaining the density of the modeling solution 10 in the inside 124 of the thin part equal to the density of the modeling solution 10 in the surface 123 of the thin part reduces the decrease of the strength of the thin part.

The modeling step includes applying the modeling solution 10 such that areas of the powder 20 to which the modeling solution 10 is applied in the inside 124 of the 3D modeled object 101 and areas of the powder 20 to which the modeling solution 10 is not applied are alternate.

Accordingly, because the density of the modeling solution 10 in the inside 124 of the 3D modeled object 101 is smaller than the density of the modeling solution 10 in the surface 123 of the 3D modeled object 101, occurrence of the empty spaces 125 in the inside 124 of the 3D modeled object 101 is reduced and the decrease in strength of the 3D modeled object 101 is reduced. In other words, it is possible to provide the 3D modeled object 101 that is modeled accurately and that has strength.

The modeling step includes applying the modeling solution 10 such that the size L2 of the area 128A of the powder 20 to which the modeling solution 10 is applied in the inside 124 of the 3D modeled object 101 is smaller than the size L3 of the area of the powder 20 to which the modeling solution 10 is applied in the surface 123 of the 3D modeled object 101.

Accordingly, the configuration in which the areas of the powder 20 to which the modeling solution 10 is applied in the inside 124 of the 3D modeled object 101 and areas of the powder 20 to which the modeling solution 10 is not applied are alternate results in reduction of the decrease in strength of the surface 123 of the 3D modeled object 101.

The modeling step includes applying the modeling solution 10 such that the density of the modeling solution 10 in the inside 124 of the 3D modeled object 101 is uniform.

Accordingly, even when the empty spaces 125 occur in the inside 124 of the 3D modeled object 101, local occurrence of the empty space 125 that is large is reduced and thus the decrease in strength of the 3D modeled object 101 is reduced.

Furthermore, the modeling step illustrated in FIG. 7 includes applying the modeling solution 10 such that the size of the area of the powder 20 to which the modeling solution 10 is not applied in the inside 124 of the 3D modeled object 101 is smaller than L below:

$$L1=D\cdot(1/T-R)^{1/3}$$

where D denotes a particle diameter of the powder 20, T denotes a tap density of the powder 20, and R denotes a density of the 3D modeled object 101 that is modeled at the modeling step.

Accordingly, occurrence of the empty space 125 in the inside 124 of the 3D modeled object 101 is reduced as much as possible.

According to the disclosure, it is possible to provide a 3D modeled object that is modeled accurately and that has strength.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A method of manufacturing a 3D modeled object, comprising:

modeling including applying a modeling solution to powder laid in layers, hardening the powder to which the modeling solution applied to form modeling layers, and sequentially stacking the modeling layers to form the 3D modeled object; and immersing the 3D modeled object modeled at the modeling in a removal solution to remove the powder to which the modeling solution is not applied, wherein at the modeling, the modeling solution is applied such that a density of the modeling solution in an inside of the 3D modeled object is smaller than a density of the modeling solution in a surface of the 3D modeled object and an area of the powder to which the modeling solution is applied and an area of the powder to which the modeling solution is not applied are alternate in the inside of the 3D modeled object, at the modeling, the modeling solution is applied such that a size of the area of the powder to which the modeling solution is not applied in the inside of the 3D modeled object is smaller than L1 below:

$$L1 = D \cdot (1/T - R)^{1/3}$$

where D denotes a particle diameter of the powder, T denotes a tap density of the powder, and R denotes a density of the 3D modeled object modeled at the modeling.

2. The method according to claim 1, wherein at the modeling, the modeling solution is applied such that a size of the area of the powder to which the modeling solution is applied in the inside of the 3D modeled object is smaller than a size of an area of the powder to which the modeling solution is applied in the surface of the 3D modeled object.

3. The method according to claim 1, wherein at the modeling, the modeling solution is applied such that the density of the modeling solution in the inside of the 3D modeled object is uniform.

4. The method according to claim 1, wherein the area of the powder to which the modeling solution is applied and the area of the powder to which the modeling solution is not applied are in a grid in the inside of the 3D modeled object.

5. The method according to claim 1, wherein the modeling solution contains a cross-linker in a liquid medium.

6. The method according to claim 1, wherein the powder includes a base material and a dissolvable organic material that coats the base material, and an average thickness of the dissolvable organic material on the base material is 5 nm to 1000 nm.

7. The method according to claim 1, wherein the powder includes metal.

8. The method according to claim 1, wherein the powder includes aluminum.

9. A 3D modeling apparatus, comprising circuitry configured to perform the method of manufacturing the 3D modeled object according to claim 1.

10. A non-transitory computer readable storage medium including instructions stored thereon which, when executed by at least one processor, cause the at least one processor to perform the method of manufacturing the 3D modeled object according to claim 1.

* * * * *